United States Patent Office 3,514,503
Patented May 26, 1970

3,514,503
CYCLOBUTYLMETHYL PHOSPHATE AND PHOSPHONATE ESTERS
Gerald H. Peterson, 1326 S. Armacost Ave., West Los Angeles, Calif. 90025
No Drawing. Filed June 16, 1967, Ser. No. 646,472
Int. Cl. C07f 9/08, 9/38; C09k 3/00
U.S. Cl. 260—958      13 Claims

ABSTRACT OF THE DISCLOSURE

This invention relates to chemical compounds which are phosphate esters and phosphonate esters having three organic radicals at least one of which is the cyclobutylmethyl radical and the other organic radicals of which are the cyclobutylmethyl radical, the phenyl radical, or the tolyl radical.

These chemical compounds are useful for thermally stable fire resistant hydraulic fluids, especially for aircraft, either alone or admixed with other additives.

This invention relates to new chemical compounds which are phosphate esters and phosphonate esters having three organic radicals at least one of which is the cyclobutylmethyl radical and the other organic radicals of which are the cyclobutylmethyl radical, the phenyl radical, or the tolyl radical.

These new chemical compound are useful for thermally stable fire resistant hydraulic fluids, especially for aircraft, either alone or admixed with other additives.

These compounds particularly include the following:

(1) Phosphate esters

Tri-cyclobutylmethyl phosphate
Di-cyclobutylmethyl phenyl phosphate
Mono-cyclobutylmethyl di-phenyl phosphate
Di-cyclobutylmethyl tolyl phosphate
Mono-cyclobutylmethyl di-tolyl phenyl phosphate
Mono-cyclobutylmethyl tolyl phenyl phosphate (2) Phosphonate esters Di-cyclobutylmethyl cyclobutylmethane phosphonate
Di-cyclobutylmethyl benzene phosphonate
Di-phenyl cyclobutylmethane phosphonate
Di-cyclobutylmethyl toluene phosphonate
Di-tolyl cyclobutylmethane phosphonate
Mono-cyclobutylmethyl tolyl benzene phosphonate
Mono-cyclobutylmethyl phenyl toluene phosphonate The cyclobutylmethyl radical is shown as follows:

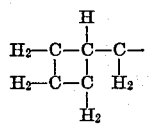

Each of these new foregoing chemical compounds can be made by the same methods used for making the corresponding phosphates and phosphonates where the butyl radical is used instead of the cyclobutylmethyl radical. The methods of making the corresponding phosphates and phosphonates with butyl radical are known to those skilled in the art, and with the disclosure herein those skilled in the art to which my invention appertains will be able to make and use the new chemical compounds of my invention.

The preparation of the known phosphate esters and phosphonate esters having the butyl radical instead of the cyclobutylmethyl radical of my invention is disclosed in the books entitled "Introduction to Hydraulic Fluids" by Roger E. Hatton, published by Reinhold Publishing Corporation, "Organo-Phosphorous Compounds" by G. M. Kosolopoff, published by John Wiley and Sons, "Synthetic Lubricants" edited by Reigh C. Gunderson and Andrew W. Hart, published by Reinhold Publishing Corporation, New York, and numerous other publications and issued patents. The particular relevant disclosure in the book entitled "Introduction to Hydraulic Fluids" appears on pages 190 through 195, and the particular relevant disclosure in the book entitled "Synthetic Lubricants" appears on pages 103 through 150.

Even though those skilled in the art will be able to prepare and use the new chemical compounds of my invention, there is given below examples of these compounds and their preparation.

EXAMPLE 1

Tri-cyclobutylmethyl phosphate 3.5 mols of cyclobutylmethyl alcohol are added dropwise with stirring to one mol of phosphorus oxychloride ($POCl_3$) at 25–35° C. The temperature is slowly brought up to about 65° C. and the pressure is slowly reduced to 50 mm./Hg with stirring to remove hydrogen chloride. The mixture is then distilled and tri-cyclobutylmethyl phosphate is collected.

EXAMPLE 2

Tri-cyclobutylmethyl phosphate

To 5 mols of cyclobutylmethanol, 3 mols of freshly cut metallic sodium are added in small cubes about ¼″ with stirring and maintaining the temperature between 25 and 40° C. When reaction is complete as evidenced by cessation of bubbling, 1 mol of phosphorus oxychloride ($POCl_3$) is added dropwise with stirring while maintaining the temperature at about 25–50° C. The reaction mixture is filtered to remove the precipitated sodium chloride and the filtrate is distilled and tri-cyclobutylmethyl phosphate is collected.

EXAMPLE 3

Di-cyclobutylmethyl phenyl phosphate 2 mols of cyclobutylmethanol are added dropwise with stirring to 1 mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C., to a saturated solution of 1 mol of phenol in 1 mol of sodium hydroxide with good stirring. The mixture is allowed to rise in temperature to 25° C., with continued stirring. The resulting mixture is washed, dried and distilled to separate out the desired water insoluble di-cyclobutylmethyl phenyl phosphate.

EXAMPLE 4

Di-cyclobutylmethyl tolyl phosphate 2 mols of cyclobutylmethanol are added dropwise with stirring to 1 mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble di-cyclobutylmethyl tolyl phosphate.

EXAMPLE 5

Mono-cyclobutylmethyl di-phenyl phosphate 1 mol of cyclobutylmethanol is added dropwise with stirring to 1 mol of $POCl_3$ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of phenol in 2 mols of NaOH with good stirring. The mixture is allowed to rise in temperature to 25° C. with continued stirring. The resulting mixture is washed, dried and distilled to separate out the desired water insoluble mono-cyclobutylmethyl di-phenyl phosphate.

EXAMPLE 6

Mono-cyclobutylmethyl para-tolyl phosphate 1 mol of cyclobutylmethanol is added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 2 mols of paracresol in 2 mols of NaOH with good stirring. The mixture is allowed to rise in temperature to 25° C. with continued stirring. The resulting mixture is washed, dried and distilled to separate out the desired water insoluble mono-cyclobutylmethyl para-tolyl phosphate.

EXAMPLE 7

Mono-cyclobutylmethyl phenyl tolyl phosphate 1 mol of cyclobutylmethanol is added dropwise with stirring to 1 mol of POCl₃ at 25–35° C. The temperature is slowly brought up to about 65° C. and the pressure slowly reduced to 50 mm./Hg to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The mixture is filtered and the filtrate is added dropwise, without further purification, at 0–5° C. to a saturated solution of 1 mol of meta-cresol in 1 mol of NaOH with good stirring. The mixture is allowed to rise in temperature with continued stirring. The resulting mixture is washed, dried and distilled to separate out the desired water insoluble mono-cyclobutylmethyl phenyl meta-tolyl phosphate.

EXAMPLE 8

Di-cyclobutylmethyl cyclobutylmethane phosphonate 3 mols of cyclobutylmethanol are added dropwise with stiring to 1 mol of cyclobutylmethane phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclobutylmethyl cyclobutylmethane phosphonate is collected.

EXAMPLE 9

Di-phenyl cyclobutylmethane phosphonate 3 mols of phenol are added dropwise with stirring to 1 mol of cyclobutylmethane phosphorus oxydichloride at 25–35° C. The temperature is slowly brought up to about 65° C. and the pressure is slowly reduced to 50 mm./Hg with stirring to remove hydrogen chloride. The mixture is then distilled and di-phenyl cyclobutylmethane phosphonate is collected.

EXAMPLE 10

Di-meta-tolyl cyclobutylmethane phosphonate 3 mols of meta-cresol are added dropwise with stirring to 1 mol of cyclobutylmethane phosphorus oxydichloride at 25–35° C. The temperature is slowly brought up to about 65° C. and the pressure is slowly reduced to 50 mm./Hg with stirirng to remove hydrogen chloride. The mixture is then distilled and di-meta-tolyl cyclobutylmethane phosphonate is collected.

EXAMPLE 11

Cyclobutylmethyl meta-tolyl cyclobutylmethane phosphonate 1 mol of cyclobutylmethanol is added dropwise with stirring to 1 mol of cyclobutylmethane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of meta-cresol in 1 mol of sodium hydroxide with good stirring. The mixture is allowed to rise in temperature to 25° C. with continued stirring. The resulting mixture is washed, dried and distilled to separate out the desired water insoluble cyclobutylmethyl meta-tolyl cyclobutylmethane phosphonate.

EXAMPLE 12

Cyclobutylmethyl phenyl cyclobutylmethane phosphonate 1 mol of cyclobutylmethanol is added dropwise with stirring to 1 mol of cyclobutylmethane phosphorus oxydichloride at 25–35° C. The temperature is slowly brought up to about 65° C. and the pressure is slowly reduced to 50 mm./Hg with stirring to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The resulting mixture is washed, dried and distilled to separate out the desired water insoluble cyclobutylmethyl phenyl cyclobutylmethane phosphonate.

EXAMPLE 13

Di-cyclobutylmethyl benzene phosphonate 3 mols of cyclobutylmethanol are added dropwise with stirring to 1 mol of benzene phenyl phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclobutylmethyl benzene phosphonate is collected.

EXAMPLE 14

Di-cyclobutylmethyl toluene phosphonate 3 mols of cyclobutylmethanol are added dropwise with stirring to 1 mol of meta-toluene phosphorus oxydichloride at 25–35° C. The temperature is slowly brought up to about 65° C. and the pressure is slowly reduced to 50 mm./Hg with stirring to remove hydrogen chloride. The mixture is then distilled and di-cyclobutylmethyl toluene phosphonate is collected.

EXAMPLE 15

Cyclobutylmethyl phenyl benzene phosphonate 1 mol of cyclobutylmethanol is added dropwise with stirring to 1 mol of benzene phosphorus oxydichloride at 25–35° C. The temperature is slowly brought up to about 65° C. and the pressure is slowly reduced to 50 mm./Hg. with stirring to remove hydrogen chloride. Without further purification this mixture is added dropwise at 0–5° C. to a saturated solution of 1 mol of phenol in 1 mol of sodium hydroxide with good stirring. The mixture is allowed to rise in temperature to 25° C. with continued stirring. The mixture is washed, dried and distilled and cyclobutylmethyl phenyl benzene phosphonate is collected.

EXAMPLE 16

Cyclobutylmethyl meta-tolyl benzene phosphonate 1 mol of cyclobutylmethanol is added dropwise with stirring to 1 mol of benzene phosphorus oxydichloride at 25-35° C. The temperature is slowly brought up to about 65° C. and the pressure is slowly reduced to 50 mm./Hg. with stirring to remove hydrogen chloride. Without further purification this mixture is added dropwise at 0-5° C. to a saturated solution of 1 mol of meta-cresol in 1 mol of sodium hydroxide with good stirring. The mixture is allowed to rise in temperature to 25° C. with continued stirring. The mixture is washed, dried and distilled and cyclobutylmethyl meta-tolyl benzene phosphonate is collected.

EXAMPLE 17

Cyclobutylmethyl tolyl toluene phosphonate 1 mol of cyclobutylmethanol is added dropwise with stirring to 1 mol of meta-toluene phosphorus oxydichloride at 25-35° C. The temperature is slowly brought up to about 65° C. and the pressure is slowly reduced to 50 mm./Hg. with stirring to remove hydrogen chloride. Without further purification this mixture is added dropwise at 0-5° C. to a saturated solution of 1 mol of meta-cresol in 1 mol of sodium hydroxide with good stirring. This mixture is allowed to rise in temperature to 25° C. with continued stirring. The mixture is washed, dried and distilled and cyclobutylmethyl tolyl toluene phosphonate is collected.

EXAMPLE 18

Cyclobutylmethyl phenyl toluene phosphonate 1 mol of cyclobutylmethanol is added dropwise with stirring to 1 mol of meta-toluene phosphorus oxydichloride at 25-35° C. The temperature is slowly brought up to about 65° C. and the pressure is slowly reduced to 50 mm./Hg. with stirring to remove hydrogen chloride. Without further purification this mixture is added dropwise at 0-5° C. to a saturated solution of 1 mol of phenol in 1 mol of sodium hydroxide with good stirring. This mixture is allowed to rise in temperature to 25° C. with continued stirring. The mixture is washed, dried and distilled and cyclobutylmethyl phenyl toluene phosphonate is collected.

EXAMPLE 19

Tolyl phenyl cyclobutylmethane phosphonate 1 mol of meta-cresol is added dropwise with stirring to 1 mol of cyclobutylmethane phosphorus oxydichloride at 25-35° C. The temperature is slowly brought up to about 65° C. and the pressure is slowly reduced to 50 mm./Hg. with stirring to remove hydrogen chloride. Without further purification this mixture is added dropwise at 0-5° C. to a saturated solution of 1 mol of phenol in 1 mol sodium hydroxide with good stirring. This mixture is allowed to rise in temperature to 25° C. with continued stirring. The mixture is washed, dried and distilled and tolyl phenyl cyclobutylmethane phosphonate is collected.

The foregoing examples illustrate the phosphate and phosphonate esters of my invention with the cyclobutylmethyl radical.

The compositions of my invention have high thermal stability apparently due to the presence of the cyclobutylmethyl radical, high fire resistance, good lubricity, especially hydrodynamic lubricity, good boundary lubrication and good anti-wear, have ability to lubricate moving parts, particularly steel on steel, good viscosity and viscosity-temperature properties, and are readily admixed with many additives.

I claim:
1. The phosphate and phosphonate esters represented by the formula $(R_1R_2R_3)O_2O_xPO$ in which $x$ may be one or zero, $R_1$ is cyclobutylmethyl, and $R_2$ and $R_3$ are cyclobutylmethyl, phenyl, or tolyl.
2. The chemical compound as defined in claim 1 which is tri-cyclobutylmethyl phosphate.
3. The chemical compound as defined in claim 1 which is di-cyclobutylmethyl cyclobutylmethane phosphonate.
4. The chemical compound as defined in claim 1 which is di-cyclobutylmethyl phenyl phosphate.
5. The chemical compound as defined in claim 1 which is di-cyclobutylmethyl benzene phosphonate.
6. The chemical compound as defined in claim 1 which is di-cyclobutylmethyl tolyl phosphonate.
7. The chemical compound as defined in claim 1 which is mono-cyclobutylmethyl di-phenyl phosphate.
8. The chemical compound as defined in claim 1 which is mono-cyclobutylmethyl phenyl benzene phosphonate.
9. The chemical compound as defined in claim 1 which is mono-cyclobutylmethyl di-tolyl phosphate.
10. The chemical compound as defined in claim 1 which is mono-cyclobutylmethyl tolyl toluene phosphonate.
11. The chemical compound as defined in claim 1 which is mono-cyclobutylmethyl tolyl phenyl phosphate.
12. The chemical compound as defined in claim 1 which is mono-cyclobutylmethyl tolyl benzene phosphonate.
13. The chemical compound as defined in claim 1 which is mono-cyclobutylmethyl phenyl toluene phosphonate.

References Cited

UNITED STATES PATENTS 1,959,228  5/1934  Blagden et al. ___ 260—958 XR
2,682,522  6/1954  Coover et al. ____ 260—958 XR CHARLES B. PARKER, Primary Examiner A. H. SUTTO, Assistant Examiner U.S. Cl. X.R.

252—78; 260—973, 974